United States Patent
Wang et al.

(10) Patent No.: US 8,508,719 B2
(45) Date of Patent: Aug. 13, 2013

(54) METHOD FOR MEASURING THE HEIGHTS OF COMPONENTS BASED ON LASER RANGING

(75) Inventors: Han-Wei Wang, New Taipei (TW); Tsai-sheng Shen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 119 days.

(21) Appl. No.: 13/293,106

(22) Filed: Nov. 9, 2011

(65) Prior Publication Data
US 2013/0114065 A1 May 9, 2013

(51) Int. Cl.
*G01C 3/08* (2006.01)
(52) U.S. Cl.
USPC .......... 356/4.01; 356/5.02; 356/614; 356/625
(58) Field of Classification Search
USPC ........................ 356/4.01, 5.01, 5.02, 614–632
See application file for complete search history.

(56) References Cited

U.S. PATENT DOCUMENTS

| | | | | |
|---|---|---|---|---|
| 3,527,533 A | * | 9/1970 | Dishington et al. | 356/5.04 |
| 5,841,540 A | * | 11/1998 | Mondie | 356/630 |
| 6,448,572 B1 | * | 9/2002 | Tennant et al. | 250/559.38 |
| 6,657,706 B2 | * | 12/2003 | Levine et al. | 356/5.01 |
| 8,390,792 B2 | * | 3/2013 | Rung et al. | 356/4.01 |
| 2009/0168045 A1 | * | 7/2009 | Lin et al. | 356/4.01 |

* cited by examiner

*Primary Examiner* — Hoa Pham
(74) *Attorney, Agent, or Firm* — Cheng-Ju Chiang

(57) ABSTRACT

Provided is a method for measuring the heights of components based on laser ranging, including the following steps of: 1) a laser ranger uniformly moving along a test route and measuring the distance from each test point to the laser ranger; 2) the laser ranger transmitting the measurement result and the measurement time to a storage unit; 3) the storage unit sending the received measurement result and the received measurement time to an analysis unit; and 4) according to the data sent by the storage unit and referring to the test route and the position of each test point, the analysis unit calculating the height of each test point and outputting it. The method of the present invention omits the time of determining the position of each point and the start-stop time of the laser ranger at each test point so that saving the large amount of the measurement time.

4 Claims, 4 Drawing Sheets

METHOD FOR MEASURING THE HEIGHTS OF COMPONENTS BASED ON LASER RANGING

BACKGROUND OF THE INVENTION

1. Field of the Invention

The present invention relates to a method for measuring the height, and more particularly to a method for measuring the height of a product having multiple components based on laser ranging technology.

2. Description of the Prior Art

The laser ranging technology is a ranging technology by using a laser as a source. The basic principle thereof is that a distance between a laser ranger and an object under test can be calculated according to the time interval between the emission and reception of the laser light, which is emitted out of the laser ranger, then reflected by the object under test and finally received by the laser ranger. The ranging formula is: $D=0.5\,cxt$, where D represents the distance between the laser ranger and the object under test, c represents the velocity of light, and t represents the time interval between the emission and reception of the laser light.

The laser ranging is not only widely used as a ranging technology, but also widely used as a test means in the industry test. For example, it can be used to measure the height of the product or the thickness between two opposite surfaces of the product for testing whether the size of the product accords with the product specification on the basis of the laser ranging principle. When measuring the height or the thickness of the object by the laser ranging principle, it needs to respectively measure the distances from the laser ranger to two surfaces of the object, and then calculates the difference between the distances from the laser ranger to two surfaces of the object, so that obtaining the test result of the height or the thickness of the object.

In the actual manufacture, when determining whether the product's size accords with the specification by means of the laser ranging, the laser ranger may measure the height of a single product, and also may measure the height of a product having multi-components with the different heights. In the prior art, when one product under test has multiple components under test, usually the tester will select a point under test on the surface of each component for going to test. As shown in FIG. 1, when measuring the height of each point of the product having the multiple components, the laser ranger generally needs a pause. Namely, when the laser ranger arrives at one point, and then pauses to measure the height of the one point. After this one point is measured, the laser ranger then moves on next point for ready to measure. It can be seen from FIG. 1 that each point shown in FIG. 1 is a pause-for-measure point 10. This measurement mode is not only easy to result in the misjudgment or the undetected error, but also largely wastes the time because of needing to determine the position of the points under test and to start and stop the laser ranger. Particularly, if the number of the points under test is large or a great deal of the products needs to be tested, this testing mode is time-consuming and laborious.

BRIEF SUMMARY OF THE INVENTION

An object of the present invention is to provide a method for measuring the height of components based on laser ranging.

To achieve the above object, in accordance with the present invention, a method for measuring the heights of components based on laser ranging is provided, comprising the following steps of:

1) a laser ranger uniformly moving along a test route and one by one measuring the distance from each test point to the laser ranger;

2) at the same time of the step of 1), the laser ranger transmitting the measurement result of each test point on the test route together with the measurement time to a storage unit, wherein the measurement time refers to the time of the laser ranger moving to the test point;

3) after the laser ranger completing the measurement, the storage unit sending the received measurement result and the received measurement time to an analysis unit; and 4) according to the data sent by the storage unit and referring to the test route and the position of each test point, the analysis unit calculating the height of each test point and outputting it.

Preferably, the test points include a reference point for calculating the relative heights of the components.

Preferably, the relative height of each test point is determined by a distance difference between a distance from each test point to the laser ranger and a distance from the reference point to the laser ranger.

Preferably, the test route is a random shape including all test points.

Based on the above description, the method of the present invention omits the time of determining the position of each point and the start-stop time of the laser ranger at each test point so that saving the large amount of the measurement time. Particularly, the method of the present invention is adapted to measure the heights of a great deal products having the same specification. During the measurement course, it only needs to set one test route before measuring. It may directly compare the graph of the measurement result obtained according to the test route with the contour of the product for determining whether the product accords with the specification. Namely, the method of the present invention need not exactly calculate the specific height of each component of each single product so that significantly enhancing the measurement efficiency.

DETAILED DESCRIPTION OF THE PREFERRED EMBODIMENTS

The following embodiment with reference to the accompanying drawings now has been given for detail describing the technology, the feature, the object and the effect of the present invention.

Figure 2:
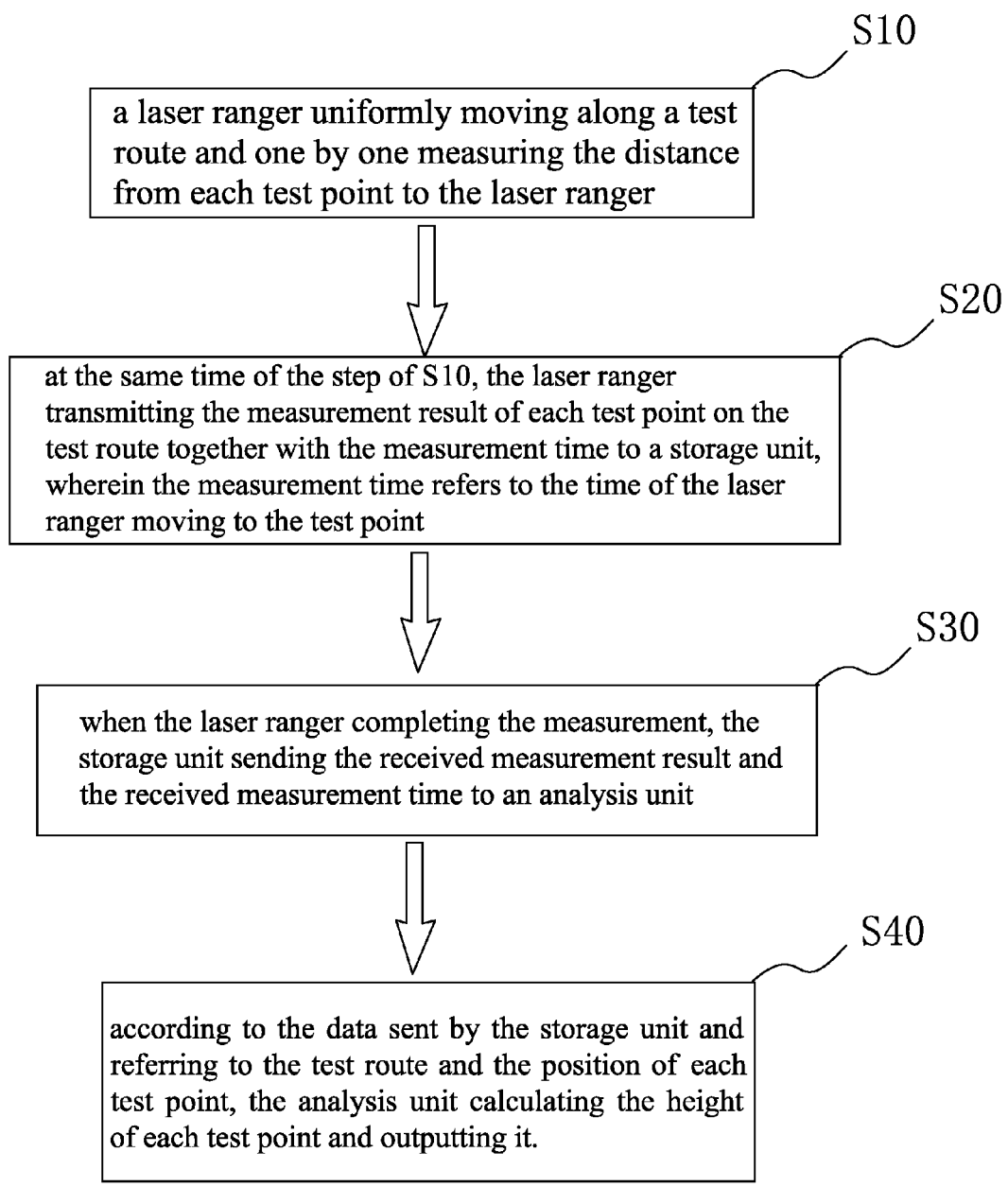
FIG. 2 is a flow chart showing a method for measuring the height in the present invention.

Please refer to FIG. 2, a method for measuring the heights of components based on laser ranging is provided in the present invention, comprising the following operation steps of:

S10: a laser ranger moves with a uniform speed along a test route 30 to measure distances from each test point 20 to the laser ranger one by one.

S20: at the same time of performing the step of S10, the laser ranger transmits the measurement result of each test point 20 on the test route 30 together with the measurement time to a storage unit for being stored, the measurement time refers to the time spent when the laser ranger moves from a start point to the test point 20.

S30: when the laser ranger finishes measuring the heights of the components, the storage unit will send all received data to an analysis unit.

S40: according to the data sent by the storage unit and referring to the test route 30 and the position of each test point 20, the analysis unit calculates the height of each test point 20 and then outputs it.

Here, the storage unit may be a hard disk, a non-volatile memory and so on. The analysis unit may be a single chip microcomputer, a microprocessor and so on. They can use the existing components to realize the function thereof, so no more repeated here.

The detail application of the method for measuring the heights of components of the present invention will be described in the following text with reference to the specific embodiment shown in FIGS. 3 to 5. In this embodiment, the product under test is a circuit board used in a charger adapter and seven components fixed on the circuit board. The seven components have different heights. Before a shell is mounted on the charger adapter, the heights of these components in the charger adapter need to be measured for confirming whether the size of the charger adapter accords with the product specification and whether the charger adapter can be accommodated in the shell, so that finishing the assembly of the product. In the factory, generally a great deal of automatic test may be completed in an automatic test station.

First, the method of the present invention needs to select one point as a test point 20 on the top surface of each of seven components, such as points 1, 3, 4, 5, 6 and 8, and also select one point 2 as a test point 20 on the top surface of the circuit board. The test point 2(20) is used as a reference point for calculating the relative heights of the components. As shown in FIG. 3, the test points 1, 3, 4, 5, 6, 8 are respectively picked on the top surfaces of the seven components, and the test point 2 is picked on the top surface of the circuit board.

The test route 30 of the laser ranger is designed according to the positions of the eight test points 20. The test route 30 must include all test points 20, and the shape of the test route 30 may be adjusted by the positions of all test points 20. According to the positions of the eight test points 20 shown in FIG. 3, the test route 30 is designed to be a curve including three lines and two corners, the specific shape of which is as shown in FIG. 4.

Before starting to measure, the test route 30 is input into a control system of the laser ranger, and the laser ranger is placed over the charger adapter and is perpendicular to the top surface of the circuit board. In the course of measurement, the laser ranger can uniformly move along the test route 30 in a plane parallel to the top surface of the circuit board. When it arrives at an end point of the test route 30, such as the test point 8(20), the measurement is over.

At the same time as the movable measurement, the laser ranger can transmit the received measurement result and the measurement time to the storage unit. The measurement time refers to the time spent when the laser ranger moves to every test point 20. After the completion of the measurement course, the storage unit will send the received data to the analysis unit. The analysis unit can analyze and calculate these data according to the data sent by the storage unit and referring to the test route 30 and the positions of all test points 20 on the test route 30, and then analysis unit can obtain and output the relative height of each component represented by the test point 20.

Figure 5:
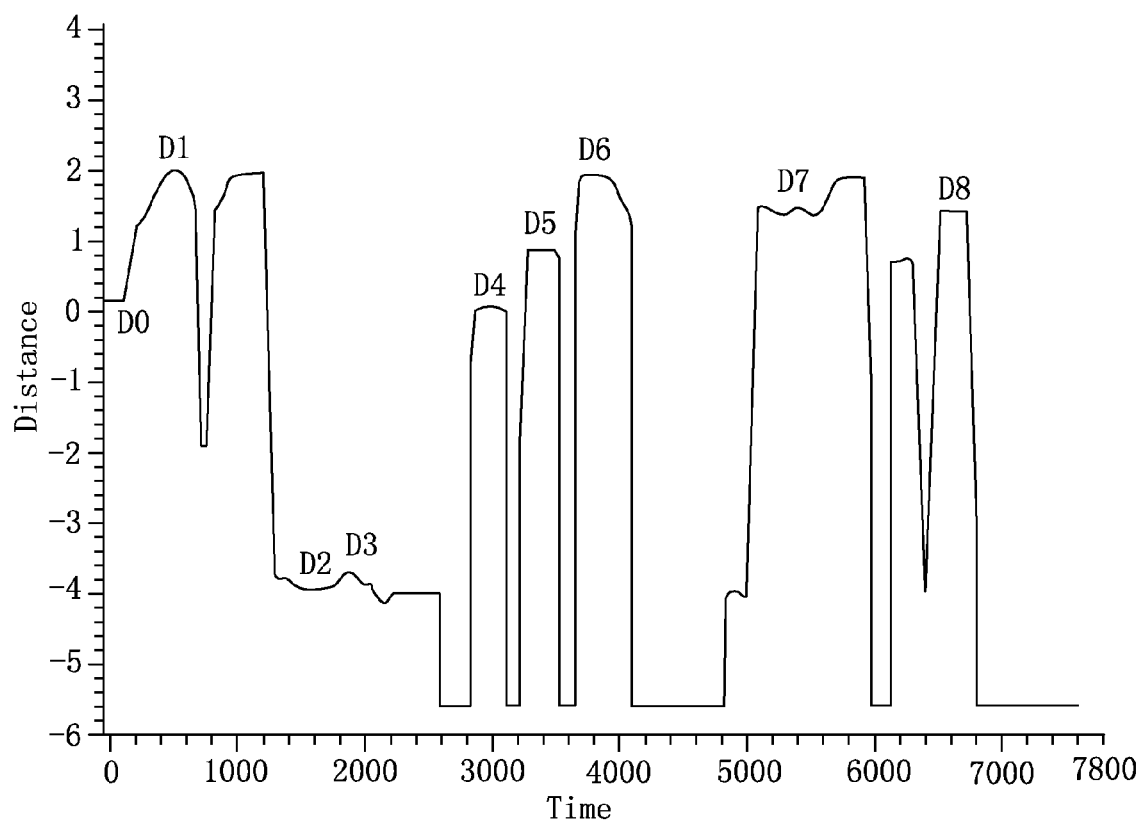
FIG. 5 is a schematic view of an obtained measurement result in one embodiment of the present invention.

In one embodiment, the schematic view of the measurement result is shown in FIG. 5, wherein a distance D0 between a start point 11 of the test route 30 and the laser ranger is used as a reference zero point, the movement time of the laser ranger is used as a horizontal coordinate, and a distance difference (D0−DX) between the distance from each test point to the laser ranger and the distance from the start point 11 to the laser ranger is used as a vertical coordinate. Because the laser ranger moves with the uniform speed, the movement time of the laser ranger is corresponding to the position of each test point of the test route 30. As shown in FIG. 5, the respective distance form each test point of the test route 30 to the laser ranger is varied with the movement time of the laser ranger, so that the obtained graph follows the contour of the components located on the test route 30.

Figure 3:
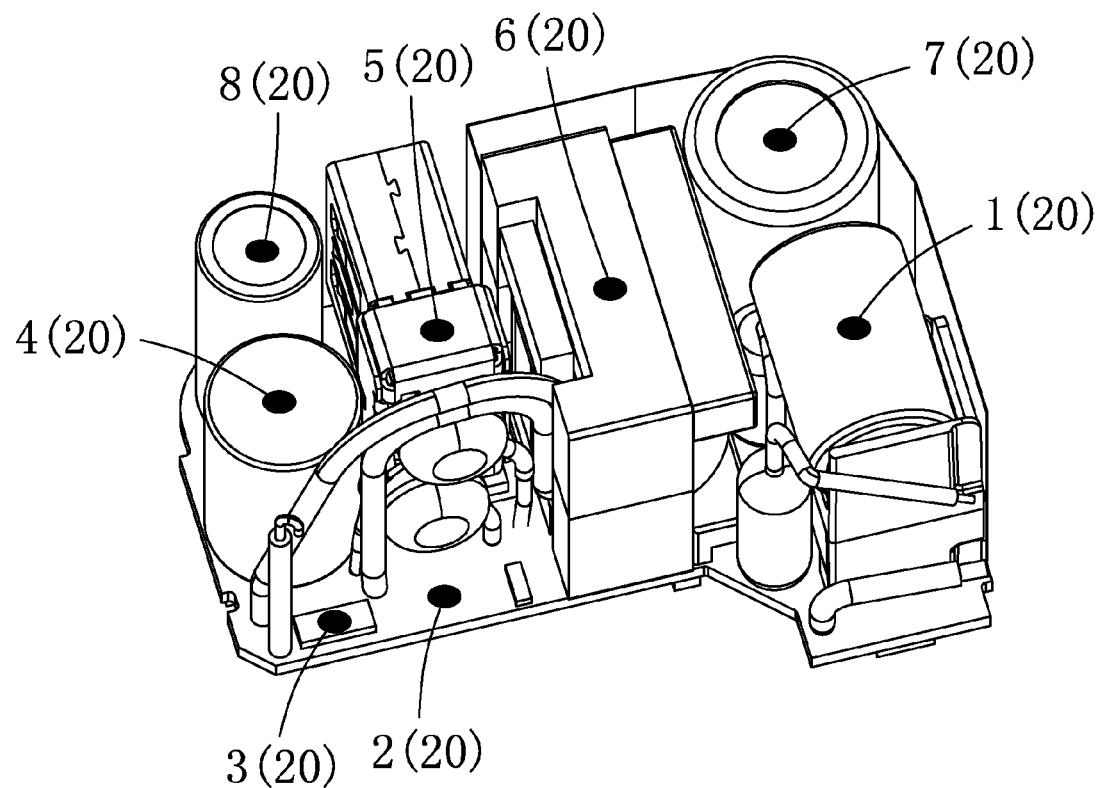
FIG. 3 is a perspective schematic view of a product having multiple components under measuring in one embodiment of the present invention.
Figure 4:
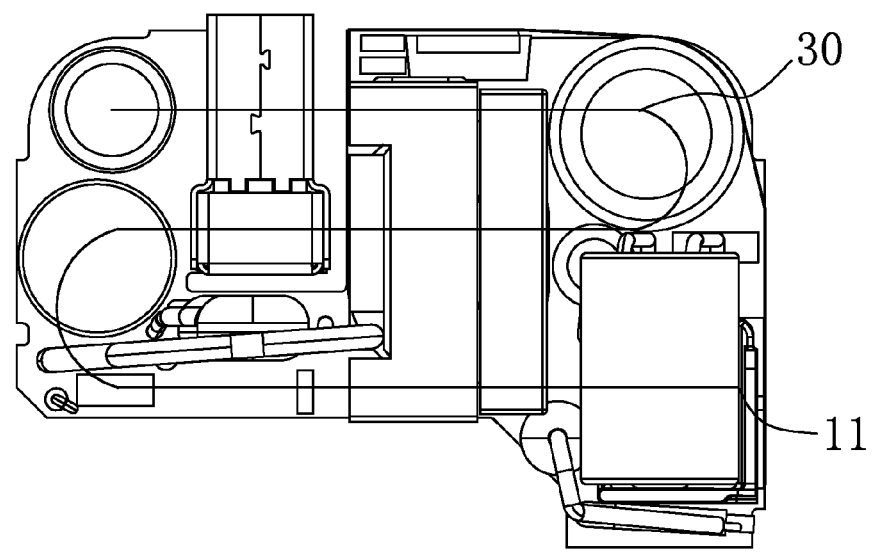
FIG. 4 is a schematic view of a measurement order for measuring the height of the product having multiple components in one embodiment of the present invention.

It can be seen from the position of each test point 20 in FIG. 3 and the test route 30 in FIG. 4 that the relative distance values of the eight test points 20 relative to the reference zero point of the test route 30 are respectively corresponding to eight peak values marked in the graph of FIG. 5. In this embodiment, D2 represents the relative distance from the circuit board to the laser ranger, so that D2 is used as the reference value of calculating the height of each component. Accordingly, the heights of the seven components are D1−D2、, D3−D2、, D4−D2、, D5−D2、, D6−D2、, D7−D2 and D8−D2, respectively.

As described above, the method for measuring the height can measure the distances from the product's surface to the laser ranger according to the predetermined test route 30, and need not pause and judge the positions of the test points 20 in the measurement course during the course of the measurement. After the completion of the measurement, the data can be analyzed to find out the measurement value of each test point, and then calculate the height of each component. The method of the present invention omits the time of determining the position of each point 20 and the start-stop time of the laser ranger at each test point 20 so that saving the large amount of the measurement time. Particularly, when the number of the test points 20 is large or a great deal of the products need be tested, the method of the present invention is a practical method.

On volume measuring the heights of the products having the same specification, the method of the present invention only needs to design one test route 30, which can be repeatedly used. Preferably, the method of the present invention may directly output the graph shown in FIG. 5 to be a result, and then compare whether the graph accords with the contour of the product, so that being directly determined whether the product accords with the specification and thus not needing to calculate the specific value of the height of each component of the product. Accordingly, the measurement efficiency of the method of the present invention is high.

Figure 1:
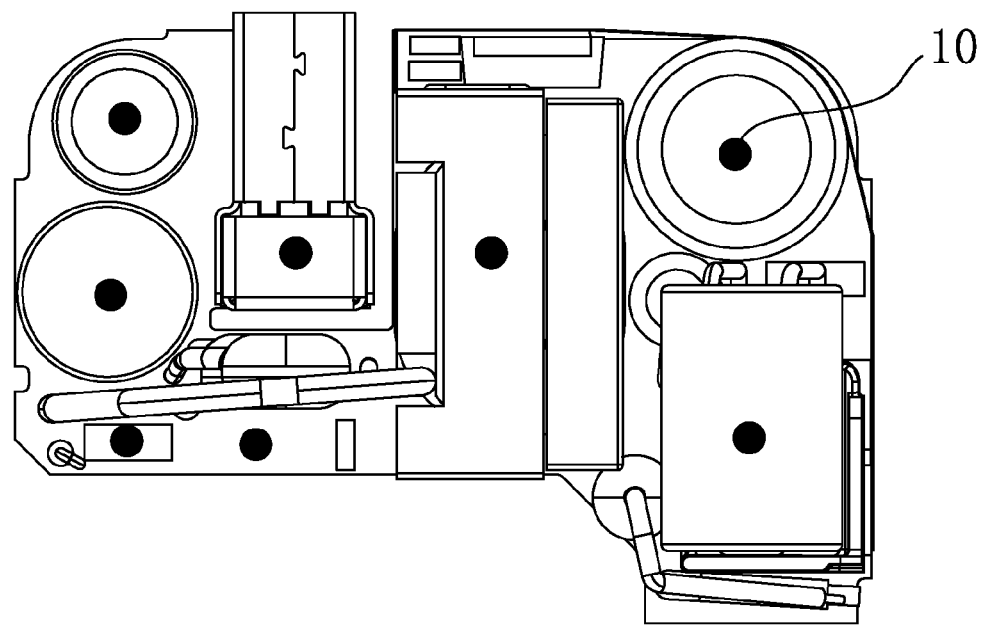
FIG. 1 is a schematic view of multiple pause measurement points used when the height of a product having multiple components under measuring in the prior art.

In above embodiment, it takes the charger adapter having seven components and eight test points for an example. When adopting the pause-for-measure method shown in FIG. 1 to measure the heights of the components, the laser ranger needs to perform eight start-stop operations in the measurement course, thus the laser ranger needs to spend nine seconds measuring one charger adapter. However, the measurement method provided by the present invention can shorten the measurement time to 3.7 seconds, so that significantly enhancing the measurement efficiency.

Moreover, when the structure of the product under test is a product having multi-components, the method of the present invention may also be used. Now, it needs to select the test points 20 on the surface of each component, and also select a reference point according to the product design as one test point 20. Referring to the positions of all test points 20, it needs to design one shortest and most effective path as one test route 30 of the laser ranger. It makes the laser ranger located on one side of the product and perpendicular to the test plane of the product, and makes the laser ranger uniformly move along the test route 30 on a plane parallel to the reference plane. The rest of the steps are same as those in above embodiment. Thereby the measurement result may be obtained.

What is claimed is:

1. A method for measuring heights of components based on laser ranging, comprising the following steps of:
   1) a laser ranger uniformly moving along a test route and one by one measuring the distance from each test point to the laser ranger;
   2) at the same time of the step of 1), the laser ranger transmitting the measurement result of each test point on the test route together with the measurement time to a storage unit, wherein the measurement time refers to the time of the laser ranger moving to the test point;
   3) after the laser ranger completing the measurement, the storage unit sending the received measurement result and the received measurement time to an analysis unit; and
   4) according to the data sent by the storage unit and referring to the test route and the position of each test point, the analysis unit calculating the height of each test point and outputting it.

2. The method as claimed in claim 1, wherein the test points include a reference point for calculating the relative heights of the components.

3. The method as claimed in claim 2, wherein the relative height of each test point is determined by a distance difference between a distance from each test point to the laser ranger and a distance from the reference point to the laser ranger.

4. The method as claimed in claim 1, wherein the test route is a random shape including all test points.

\* \* \* \* \*